(12) United States Patent
Smith

(10) Patent No.: US 6,687,967 B1
(45) Date of Patent: Feb. 10, 2004

(54) APPARATUS FOR USE IN PRODUCING A VEHICLE WHEEL

(75) Inventor: Jeffrey W. Smith, Sedalia, MO (US)

(73) Assignee: Hayes Lemmerz International, Inc., Northville, MI (US)

( * ) Notice: Subject to any disclaimer, the term of this patent is extended or adjusted under 35 U.S.C. 154(b) by 225 days.

(21) Appl. No.: 10/016,386

(22) Filed: Dec. 10, 2001

(51) Int. Cl.[7] .............................................. B25B 27/14
(52) U.S. Cl. .............................. 29/281.1; 29/894.322; 29/525; 29/802
(58) Field of Search .................... 29/281.1, 894.322, 29/525, 802, 894.323, 894.32

(56) References Cited

U.S. PATENT DOCUMENTS

| | | | | |
|---|---|---|---|---|
| 5,694,687 | A | * 12/1997 | Coleman | 29/894.323 |
| 6,357,116 | B1 | * 3/2002 | Waelchli et al. | 29/894.322 |
| 6,513,241 | B1 | * 2/2003 | Shalosky | 29/894.322 |
| 6,546,629 | B2 | * 4/2003 | Politi | 29/894.322 |
| 6,547,123 | B2 | * 4/2003 | Kemmerer | 228/212 |

* cited by examiner

*Primary Examiner*—Joseph J. Hail, III
*Assistant Examiner*—Daniel Shanley
(74) *Attorney, Agent, or Firm*—MacMillan, Sobanski & Todd, LLC

(57) ABSTRACT

This invention relates to an improved vehicle wheel idle station tooling apparatus. The vehicle wheel idle station tooling apparatus includes a center pilot and at least one rim block. The center pilot is adapted to be secured to a component of the vehicle wheel idle station tooling apparatus and defines an outer diameter which is slightly less than an inner diameter defined by a pilot hole of a vehicle wheel so as to pilot the vehicle wheel on the center pilot. The rim block is adapted to be secured to a component of the vehicle wheel idle station tooling apparatus and includes a surface which is operative to engage an outer surface of a flange of the vehicle wheel so as to support the vehicle wheel thereon. At least one of the center pilot and the rim block is releasably secured to the component by a quick release pin which enables said at least one of said center pilot and said rim block to be removed and replaced with a different sized component by a manual hand-operated manipulation of the quick release pin without resort to the utilization of a tool.

20 Claims, 5 Drawing Sheets

APPARATUS FOR USE IN PRODUCING A VEHICLE WHEEL

BACKGROUND OF THE INVENTION

This invention relates in general to vehicle wheels and in particular to an improved apparatus for use in producing a vehicle wheel.

A conventional vehicle wheel is typically of a two-piece construction and includes an inner wheel disc and an outer "full" wheel rim. The wheel disc can be cast, forged, or fabricated from steel, aluminum, or other alloys, and includes an inner annular wheel mounting portion and an outer annular portion. The wheel mounting portion of the wheel disc defines an inboard mounting surface and includes a center pilot or hub hole, and a plurality of lug receiving holes formed therethrough for mounting the vehicle wheel to an axle of the vehicle. The wheel rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the wheel disc is used. In both types of constructions, the outer annular portion of the wheel disc is secured to the wheel rim by a weld.

A full face wheel is distinguished from other types of wheels by having a one-piece wheel disc construction. In particular, the full face wheel includes a "full face" disc and a "partial" rim. The full face disc can be formed cast, forged, or fabricated from steel, aluminum, or other alloys. The full face disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial rim is fabricated from steel, aluminum, or other alloys, and includes an inboard tire bead seat retaining flange, an inboard tire bead seat, an axially extending well, and an outboard tire bead seat. In some instances, the outboard tire bead seat of the rim and the outer annular portion of the disc cooperate to form the outboard tire bead seat retaining flange of the full face wheel. In both types of constructions, the outboard tire bead seat of the rim is positioned adjacent the outer annular portion of the disc and a weld is applied to secure the rim and the disc together.

In the above wheel constructions, the wheel is produced on an assembly line. The assembly line includes a number of wheel assembly tooling stations where certain operations are performed in order to assemble and produce the finished vehicle wheel. The time required to perform a desired operation at one station may not be the same as that at another station. As a result of this, a typical wheel assembly line includes one or more "idle" tooling stations in the wheel assembly line between the "operational" stations to accommodate for these time differences or for other reasons not related to time.

The idle station tooling members in a wheel assembly line are designed for a particular vehicle wheel configuration, such as the size of the wheel or the shape of the wheel. If a "different" wheel is to be run on the wheel assembly line, the idle tooling stations need to be changed to accommodate for this different wheel. One way to change the idle station tooling for a new wheel is to remove and replace many of the individual idle station tooling members specifically designed for that particular wheel. This is a time consuming process resulting in down time on the wheel assembly line. It is also known to remove all of the idle station tooling members as a unit and replace them with another unit with tooling members for the particular wheel to be run. For this to be possible, each wheel configuration and each idle tooling station have to have a dedicated set of tooling for a particular wheel. In both of the above changeovers, several bolts have to be removed and then reinstalled using tools sized for the bolts.

SUMMARY OF THE INVENTION

This invention relates to an improved vehicle wheel idle station tooling apparatus. The vehicle wheel idle station tooling apparatus includes a center pilot and at least one rim block. The center pilot is adapted to be secured to a component of the vehicle wheel idle station tooling apparatus and defines an outer diameter which is slightly less than an inner diameter defined by a pilot hole of a vehicle wheel so as to pilot the vehicle wheel on the center pilot. The rim block is adapted to be secured to a component of the vehicle wheel idle station tooling apparatus and includes a surface which is operative to engage an outer surface of a flange of the vehicle wheel so as to support the vehicle wheel thereon. At least one of the center pilot and the rim block is releasably secured to the component by a quick release pin which enables said at least one of said center pilot and said rim block to be removed and replaced with a different sized component by a manual hand-operated manipulation of the quick release pin without resort to the utilization of a tool.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
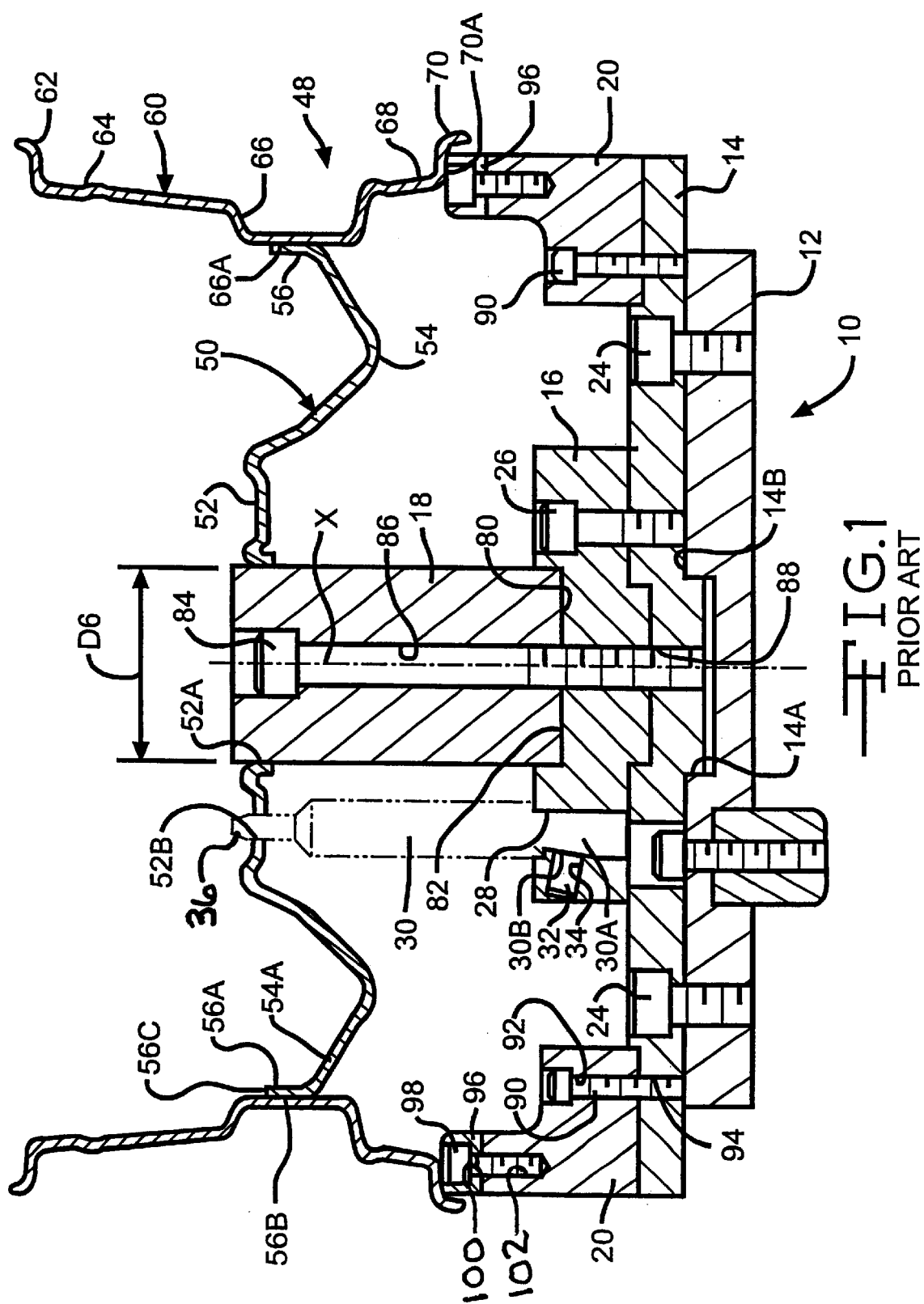
FIG. 1 is a partial sectional view of a prior art vehicle wheel idle station tooling apparatus.

Referring now to the drawings, there is illustrated in FIG. 1 a prior art vehicle wheel idle station tooling apparatus, indicated generally at 10, which is used in the manufacture of a vehicle wheel, indicted generally at 48. The vehicle wheel 48 is illustrated as being a "well attached" vehicle wheel, and includes a is wheel disc 50 and a wheel rim 60 which are joined together by a weld (not shown). The vehicle wheel 48 defines an wheel axis X. Although the present invention is illustrated and described in conjunction with the particular vehicle wheel construction disclosed herein, it will be appreciated that the invention can be used in conjunction with other types of vehicle wheel constructions.

The wheel disc 50 is forged, cast, fabricated, or otherwise formed from a suitable material, such as for example, steel, magnesium, titanium, aluminum or other alloys materials. The wheel disc 50 includes a generally centrally located inner wheel mounting portion 52, and an outer annular portion 54 which terminates in a generally axially extending outer annular flange 56. The wheel mounting portion 52 is provided with a centrally located pilot aperture 52A, and a plurality of lug bolt receiving holes 52B (only one lug bolt receiving holes 52B is illustrated in FIG. 1), spaced equidistantly from the pilot aperture 52A. The lug bolt receiving holes 52B are adapted to receive lug bolts and nuts (not shown) for securing the vehicle wheel 10 on a stationary component (not shown) of a vehicle, such as an axle.

In the illustrated embodiment, the outer annular portion 54 of the wheel disc 50 is provided with a plurality of decorative windows or openings 54A provided therein (only one of such decorative windows 54A is illustrated in FIG. 1). The outer annular flange 56 of the wheel disc 50 includes an inner axially extending cylindrical surface 56A and an outer axially extending cylindrical surface 56B which is substantially parallel to the outer cylindrical surface 56A so as to define a generally constant thickness throughout the entire length of the outer annular flange 56 of the wheel disc 50. The outer annular flange 56 of the wheel disc 50 terminates at a generally radially extending end surface 56C which defines an axial endmost surface.

The wheel rim 60 is a fabricated rim constructed of steel, magnesium, titanium, aluminum, or other alloy materials. The wheel rim 60 includes an inboard tire bead seat retaining flange 62, an inboard tire bead seat 64, a generally axially extending well 66, an outboard tire bead seat 68, and an outboard tire bead seat retaining flange 70. A section of the well 66 includes a generally axially extending inner surface 66A, and the outboard tire bead seat retaining flange 70 includes an outboard surface 70A.

During the assembly of the wheel disc 50 and the wheel rim 60 to produce the vehicle wheel 48, one or more of the vehicle wheel idle station tooling apparatus 10 is utilized. As shown in FIG. 1, the prior art idle station 10 includes a mounting plate 12, a carrier plate 14, a center retainer 16, a center pilot 18, and a plurality of outer rim blocks 20. The mounting plate 12 is a generally flat plate and is fixedly secured to a part (not shown) of the apparatus 10 by suitable means. The carrier plate 14 is a generally flat plate and is fixedly secured to the mounting plate 12 by a plurality of threaded fasteners 24 (two of such fasteners 24 being shown in FIG. 1.).

The center retainer 16 is a generally annular member and is fixedly secured to the carrier plate 14 by a plurality of threaded fasteners 26 (only one of such fasteners 26 being shown in FIG. 1) which are received in threaded openings 14B provided in the carrier plate 14. The retainer 16 includes an opening 28 formed therein for receiving an end 30A of a guide pin 30. A set screw 32 is disposed in an opening 34 provided in the side of the retainer 16. The set screw 32 is operative to contact or engage a chamfered side edge 30B of the guide pin 30 so as to secure the guide pin 30 in place. The guide pin 30 includes an outer head portion 36 which is operative to extend through a selected lug bolt hole 52B of the wheel disc 50 so as to locate and position the wheel 48 in a predetermined position in the idle station 10.

The center pilot 18 is a generally annular tooling member and includes a main body which defines an outer diameter D6. The outer diameter D6 is slightly less than the pilot aperture 52A. The center pilot 18 includes an end 80 which is received in an opening or recess 82 provided in the retainer 16. A threaded fastener 84 extends through an opening 86 provided in the center pilot 18 and is received in a threaded opening 88 provided in the retainer 16 to fixedly secure the center pilot 18 to the retainer 16.

The prior art idle station 10 includes a plurality of individual rim blocks 20 which are operative to encircle the apparatus 10 so as to support the associated surface 70A of the wheel rim 60 around a substantial portion thereof. A threaded fastener 90 extend through associated openings 92 provided in each of the rim blocks 20 and are received in threaded openings 94 provided in the carrier plate 14 to fixedly secure the associated rim block 20 to the carrier plate 14.

Each of the rim blocks 20 includes a replaceable wear strip 96 removably attached thereto. The wear strip 96 is secured to the associated rim block 20 by a plurality of threaded fasteners 98. The fasteners 98 extend through associated openings 100 provided in the wear strip 96 and are received in associated threaded openings 102 provided in the rim block 20.

As discussed above, whenever a different sized vehicle wheel 48 is being assembled, the carrier plate 14, retainer 16, pilot 18, guide pin 30 and rim blocks 20 must typically be removed and replaced with different components specifically selected to accommodate the different size of the vehicle wheel. Changing of the tooling members is time consuming, resulting in down time on the wheel assembly line. Also, it is rather expensive to inventory all the different sized components needed for the different sized vehicle wheels. The structure and operation of the prior art idle station tooling apparatus 10 thus far described is conventional in the art.

Figure 2:
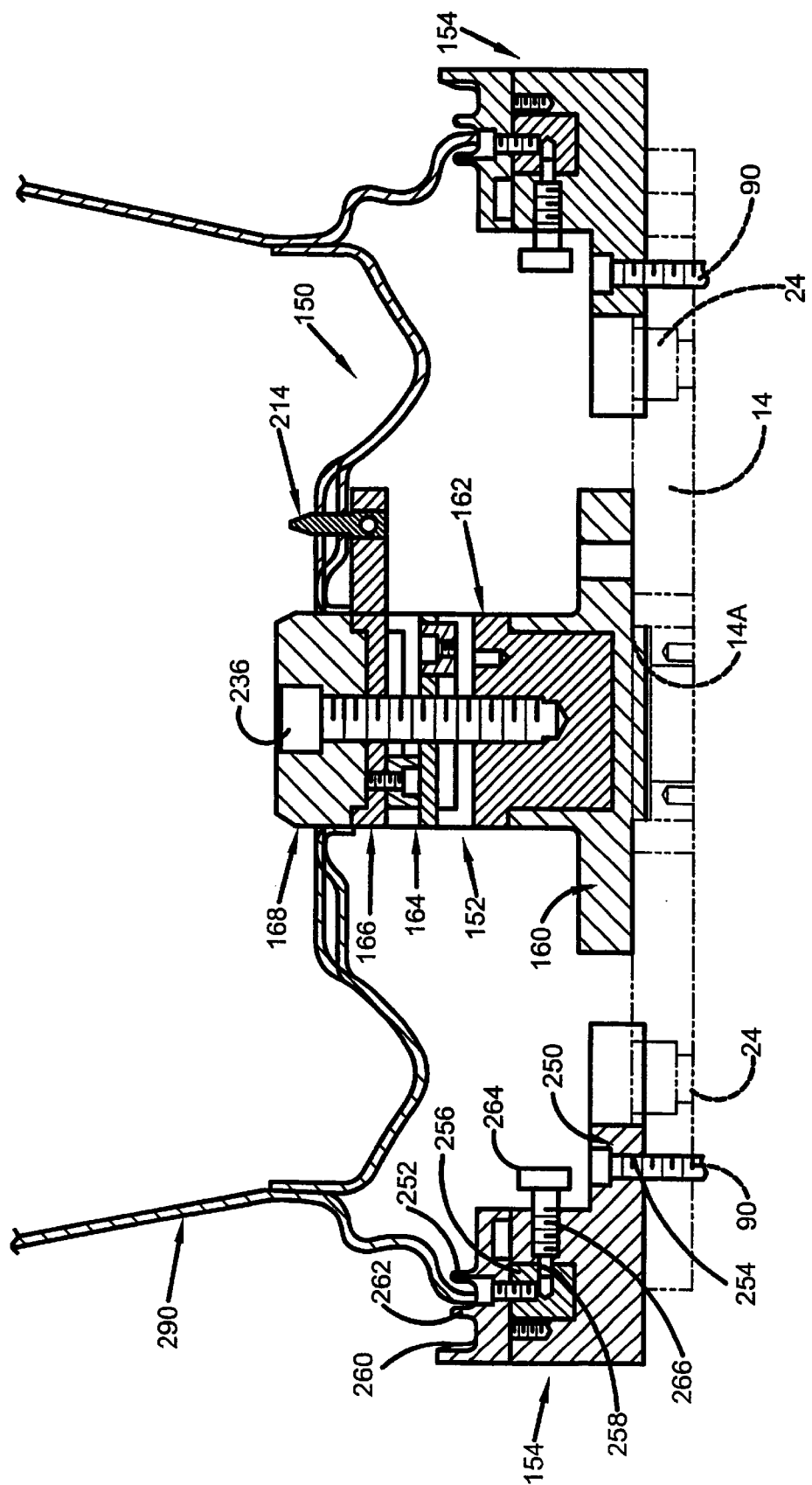
FIG. 2 is a partial sectional view of a first embodiment of a vehicle wheel idle station tooling apparatus constructed in accordance with the present invention.

Turning now to FIG. 2 and using like reference numbers to indicate corresponding parts, there is illustrated a first embodiment of an idle station tooling apparatus, indicated generally at 150, in accordance with the present invention. The illustrated idle station 150 is shown for use with a "drop center" or "well attached" vehicle wheel, indicated generally at 290. Although the present invention is illustrated and described in conjunction with the particular vehicle wheel constructions disclosed herein, it will be appreciated that the invention can be used in conjunction with other types of vehicle wheel constructions. For example, as will be discussed below in connection with FIG. 3, the vehicle wheel can be a "bead seat attached" vehicle wheel such as shown herein or shown in FIG. 4 of U.S. Pat. No. 5,188,429 to Heck et al., the disclosure of the Heck et al. patent incorporated herein by reference). The idle station 150 includes a center pilot 152 and a plurality of outer rim blocks 154.

Figure 5:
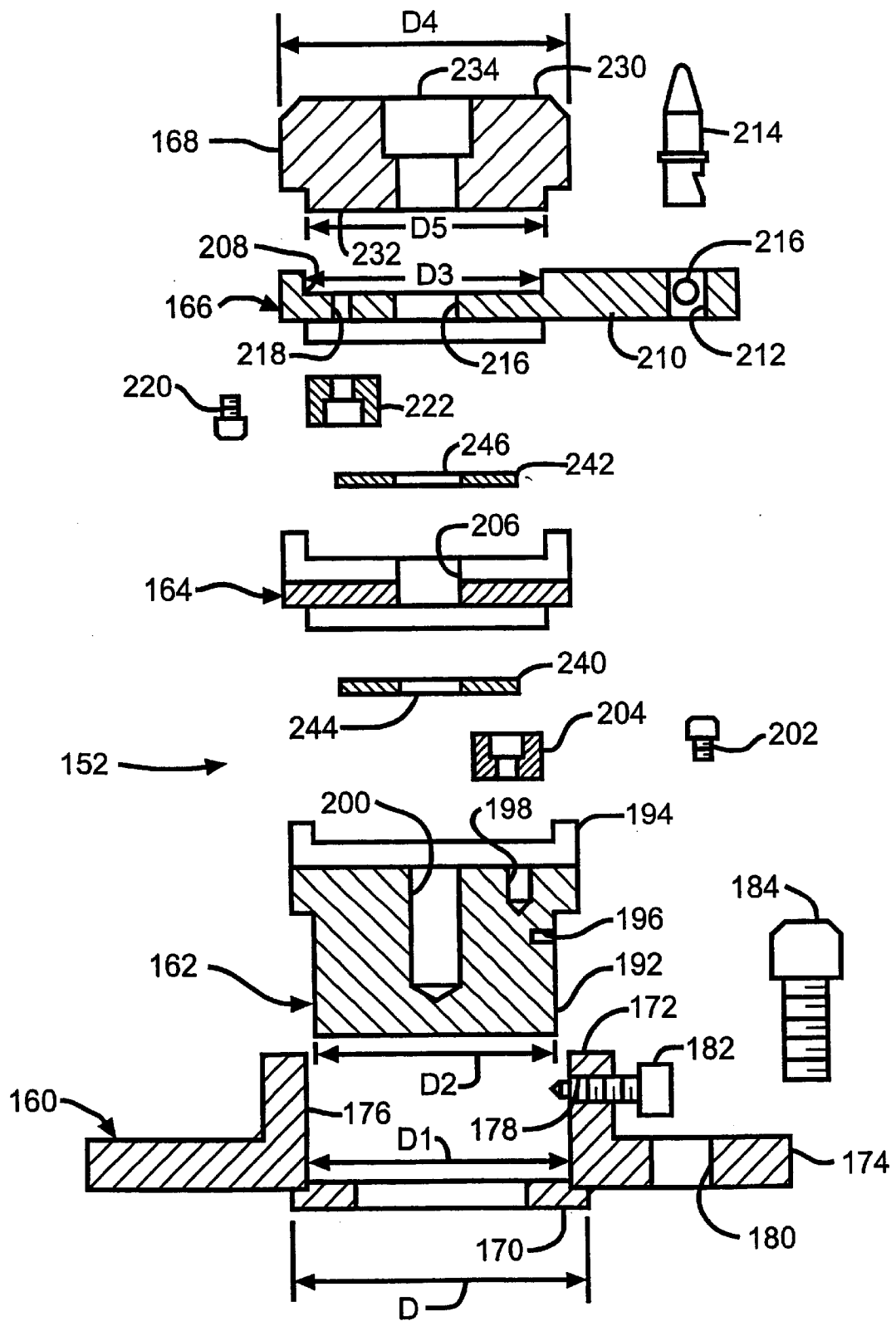
FIG. 5 is an exploded view of a portion of the vehicle wheel assembly tooling apparatus shown in FIGS. 2 and 3.

As best shown in FIG. 5, the center pilot 152 includes a base 160, a middle retainer 162, a spacer 164, a pilot and pin retainer 166 and a pilot 168 which are stacked or "nested" on top of each other. The base 160 includes a main body having a lower end 170, an upper end 172 and an outwardly extending flange portion 174. The body includes a first opening 176 and a second threaded opening 178 formed therein, and the flange portion 174 includes one or more openings 180 formed therein. The lower end 170 defines an outer diameter D which is slightly smaller than the size of an opening or recess 14A provided in the carrier plate 14 so as to be received therein in a slight interference fit therewith.

The first opening 176 of the main body defines an inner diameter D1. The second opening 178 is adapted to receive a "quick release" pin 182 therein for a purpose to be discussed below. A suitable quick release pin 182 is a part number CL-6-HRP hand-retractable plunger manufactured by Carr Lane Manufacturing Company of St. Louis, Mo. A threaded fastener 184 extends through the opening 180 in the flange 174 and is received in a threaded opening 14B provided it the carrier plate 14 so as to fixedly secure the base 160 to the carrier plate 14.

The middle retainer 162 includes a main body having a lower end 192 an increased diameter upper end 194. The lower end 192 defines an outer diameter D2 which is less than the diameter D1 of the base 160 so as to be received therein in a slightly loose fit. The middle retainer 162 further includes a first opening 196, a second opening 198 and a third threaded opening 200 formed therein. The first opening 196 is adapted to receive an end of the release pin 182 so as to releasably attach the middle retainer 162 to the base 160. The second opening 198 is a threaded opening and is adapted to receive an end of a threaded fastener 202 to secure one or more keys 204 to the upper end 194 of the middle retainer 162. The upper end 194 of the middle retainer 162 is provided with an associated keyway (not shown) formed therein for receiving each of the keys 204. The spacer 164 is interposed between the middle retainer 162 and the pilot and pin retainer 166. The spacer 164 includes a central opening 206 formed therethrough for a purpose to be discussed below.

The pilot and pin retainer 166 includes a body having an recess 208 formed therein which defines an outer diameter D3, and an outwardly extending arm 210 having an opening 212 formed therein. A guide pin 214 is disposed in the opening 212 and a set screw 216 installed in a side opening of the arm 210 is operative to engage and secure the guide pin 214 in place. The pilot and pin retainer 166 further includes a central opening 216 and one or more offset threaded openings 218 which are adapted to receive an end of a threaded fastener 220 to secure an associated key 222 thereto. To accomplish this, a lower end surface of the pilot and pin retainer 166 includes one or more keyways (not shown) formed therein.

The pilot 168 includes a main body having a chamfered outer end 230 and a reduced diameter inner end 232. The main body defines an outer diameter D4 and the inner end 232 defines an outer diameter D5. The diameter D5 is slightly less than the diameter D3 so as to be received therein an interference fit. The diameter D4 is less than the diameter of the pilot hole 52A of the wheel disc 50. The pilot 168 further includes a stepped center opening 234 formed therethrough. In addition, as shown in this embodiment, the idle station 152 includes a lower shim 240 and an upper shim 242. The lower shim 240 includes a central opening 244 and the upper shim 242 includes a central opening 246. Alternatively, the center pilot 152 can include more or less shims than illustrated including zero if so desired.

A threaded fastener 236 extends through the hole 234 of the pilot 168, the hole 216 of the pilot and pin retainer 166, the hole 246 of the upper shim 242, the hole 206 of the spacer, the hole 244 of the lower shim 240, and is received into the threaded hole 200 of the middle retainer 162. Thus, the fastener 236 is operative to secure the middle retainer 162, the spacer 164, the pilot and pin retainer 166 and the pilot 168 together, and the quick release pin 182 is operative to releasably attach the middle retainer 162 (along with the other assembled components), to the base 160. Alternatively, the structure of one or more of the base 160, the middle retainer 162, the spacer 164, the pilot and pin retainer 166 and the pilot 168 of the center pilot 152 can be other than illustrated if so desired.

Each of the rim blocks 154 includes a base 250 and a block 252 releasably attached thereto. Preferably, the base 250 and the block 252 are formed and machined as a ring and then cut into a plurality of equal segments. The base 250 is fixedly secured to the carrier plate 14 by a threaded fastener 90 which extends through an opening 254 provided in the base 250 and which is threadably received in a threaded opening provided in the carrier plate 14.

The block 252 includes a connecting pin 256 secured thereto by suitable means, such as for example, by a threaded bolt or fastener (not shown). The pin 256 includes a slotted opening 258 formed in a side thereof. The block 252 further includes a plurality of annular shaped grooves 260 and 262 formed therein. The grooves 260 and 262 are sized to accommodate different sized wheel rims. A quick release pin 264 is installed in a threaded opening 266 provided in the base 250 and an end thereof is received in the opening 258 of the pin 256. Alternatively, the block 252 could have a non-grooved or flat top surface and wear strip such as shown in FIG. 1 can be attached to the base 250.

Figure 3:
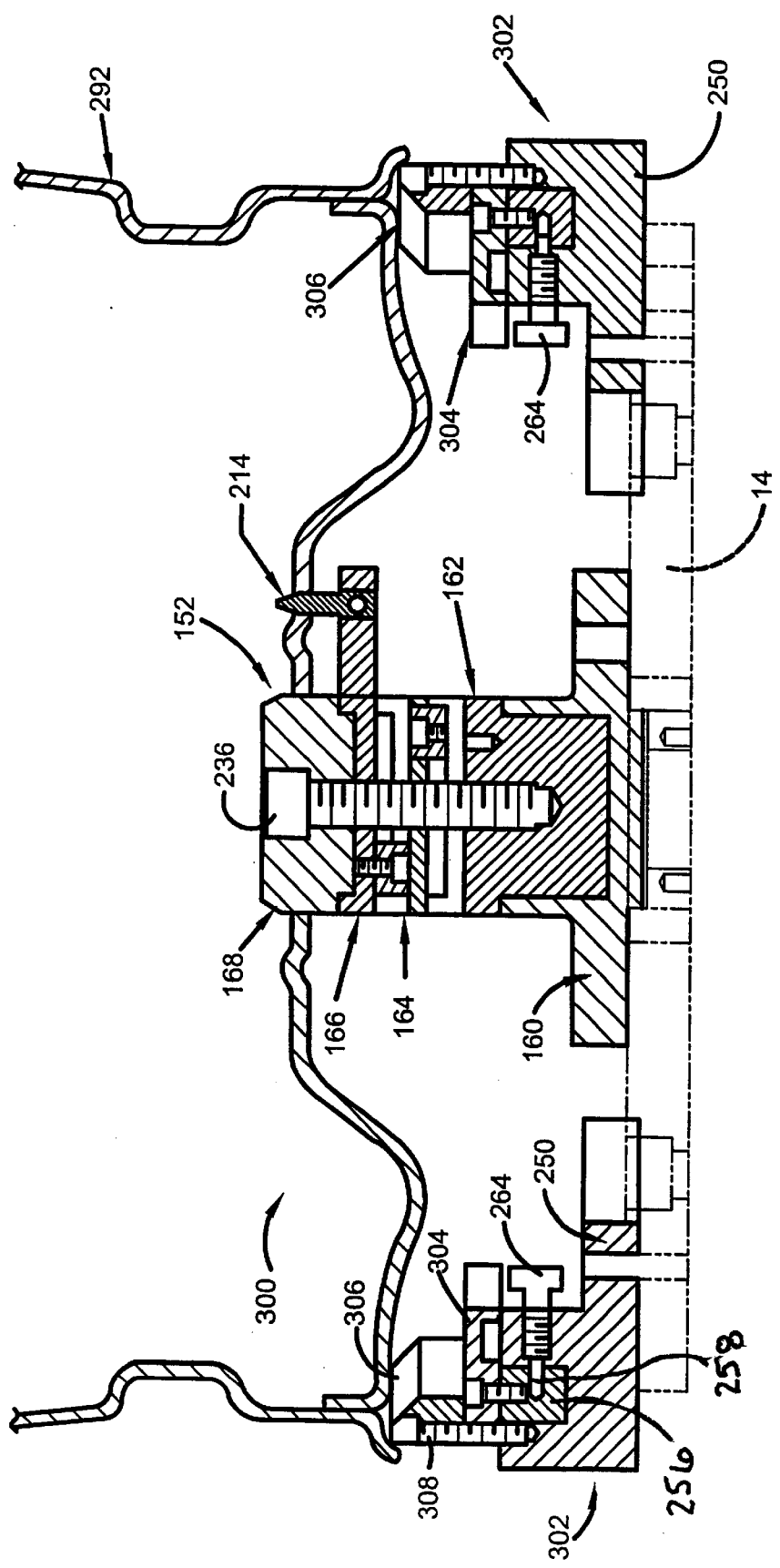
FIG. 3 is a partial sectional view of a second embodiment of a vehicle wheel idle station tooling apparatus constructed in accordance with the present invention.

Turning now to FIG. 3 and using like reference numbers to indicate corresponding parts, there is illustrated a second embodiment of an idle station tooling apparatus, indicated generally at 300, in accordance with the present invention. As mentioned above, the idle station 300 is shown for use with a bead seat attached wheel, indicated generally at 292. In this embodiment, the idle station 300 includes a plurality of outer rim blocks 302 each having a base 250, a block 304, and a wear strip 306. The block 304 includes a connecting pin 256 secured thereto by suitable means. A quick release pin 264 is installed in a threaded opening provided in the base 250 and an end thereof is received in the opening 258 of the pin 256. The wear strip 306 is attached to the block 304 by suitable means, such as for example, by a threaded fastener or bolt 308.

Figure 4:
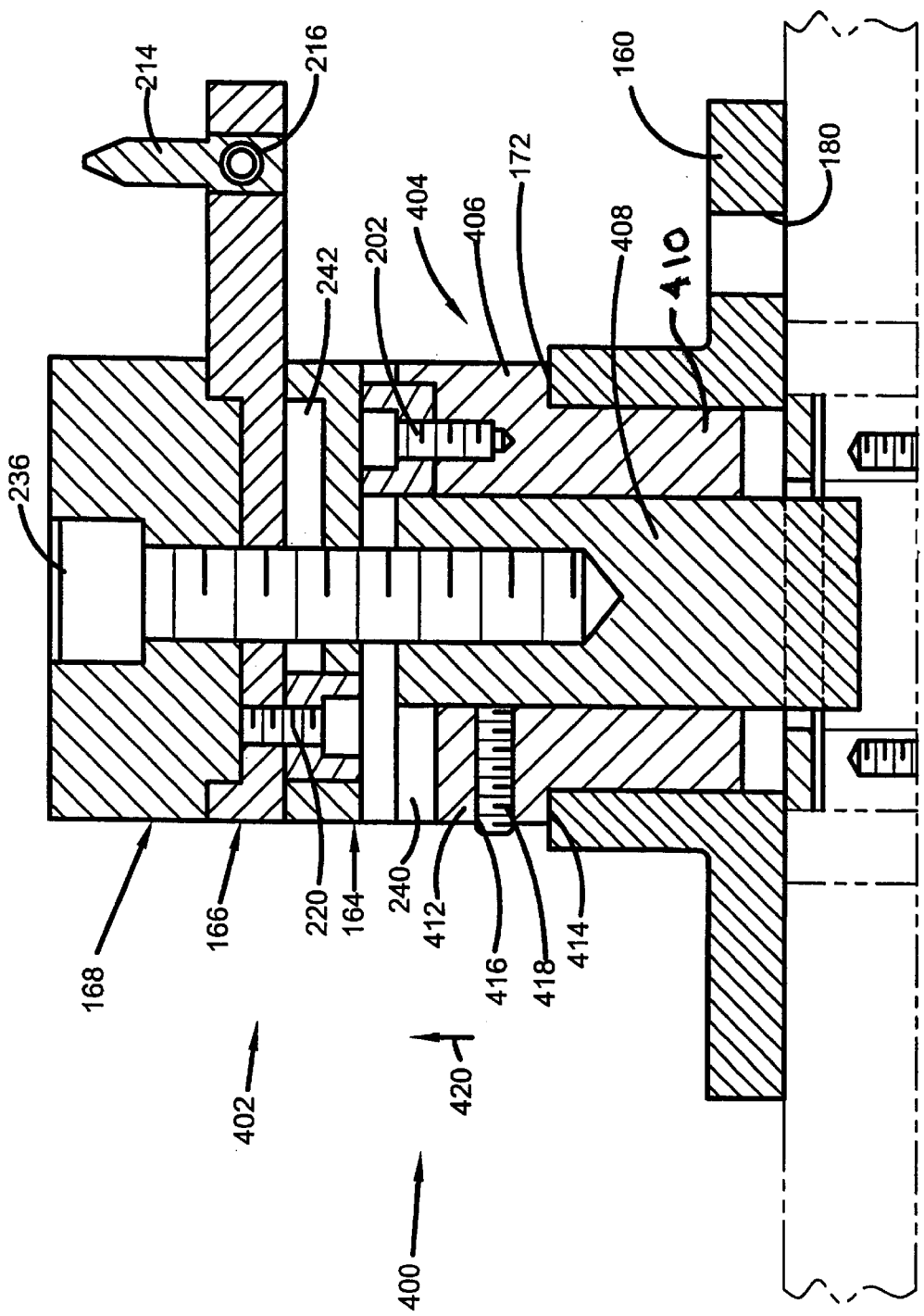
FIG. 4 is a partial sectional view of a third embodiment of a vehicle wheel idle station tooling apparatus constructed in accordance with the present invention.

Turning now to FIG. 4 and using like reference numbers to indicate corresponding parts, there is illustrated a third embodiment of a portion of an idle station tooling apparatus 400 in accordance with the present invention. In this embodiment, the idle station includes an "adjustable" center pilot 402. As shown therein, the center pilot 402 includes a mulit-component middle retainer, indicated generally at 404, instead of the one piece middle retainer 162 illustrated in FIGS. 2, 3 and 5. The multi-component middle retainer 404 includes a first stationary component 406 and a second adjustable component 408. The first component 406 includes a lower end 410 and an increased diameter upper end 412 which defines a shoulder 414 for supporting the first component 406 on the upper end 172 of the base 160. The first component 406 includes a threaded opening 416 provided in a side thereof. A set screw 418 or other suitable fastener is installed in the opening 416.

The second component 408 is adjustable relative to the base 160 by loosening of the set screw 418 and moving the component 408 upward in FIG. 4 in the direction of arrow 420. Once moved to a desired position, additional shims or spacers (not shown) can be inserted between the existing spacer 164 and/or shims 240 and 242 and the set screw 418 retightened so as to bear against the outer surface of the second component 408.

One advantage of the present invention wheel is that if desired changeover of the center pilots 152 and 404 of the associated idle station 150, 300 and 400 can be accomplished by manually pulling/removing the quick release pin 182, removing all the "assembled" components of the center pilot except for the base 174, and replacing them with a different "assembly" sized to accommodate a different sized wheel assembly. Also, the height of the center pilots of the associated idle stations can be varied by adding different thickness spacers 164 and/or shims 240 and 242. In addition, the pilot and pin retainer 166 can be changed to accommodate different wheel bolt circle diameters by removing the fastener 236 which enables a different sized pilot and pin retainer to be installed without changing any of the other components of the idle station. Also, the pilot 168 can be changed to accommodate different wheel center diameters by removing the fastener 236 which enables a different sized pilot to be installed without changing any of the other components of the idle station. In addition, the pilot and pin retainer 166, the spacer 164, and the middle retainer 162 are all keyed to maintain proper orientation. Further, the rim blocks 154 of the idle station of the present invention are provided with multiple grooves 260 and 262 formed therein to accommodate different sized wheel rims. Also, the rim blocks 154 are provided with quick release pins 264 to allow a different rim block 252 and 304 with 306 to be used with the common base 250 to accommodate different types of wheels (i.e., bead seat attached wheels and drop center wheels).

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle wheel idle station tooling apparatus comprising:
    a center pilot adapted to be secured to a component of said vehicle wheel idle station tooling apparatus, said center pilot defining an outer diameter which is slightly less than an inner diameter defined by a pilot hole of a vehicle wheel so as to pilot the vehicle wheel on said center pilot; and
    at least one rim block adapted to be secured to a component of said vehicle wheel idle station tooling apparatus, said rim block including a surface which is operative to engage an outer surface of a flange of the vehicle wheel so as to support the vehicle wheel thereon;
    wherein at least one of said center pilot and said rim block is releasably secured to the component by a quick release pin which enables said at least one of said center pilot and said rim block to be removed and replaced with a different sized component by a manual hand-operated manipulation of said quick release pin without resort to the utilization of a tool.

2. The vehicle wheel idle station tooling apparatus according to claim 1 wherein said center pilot includes a base, a middle retainer, a pilot and pin retainer and a pilot which are stacked on top of each other, said middle retainer, pilot and pin retainer and pilot connected together by a single fastener.

3. The vehicle wheel idle station tooling apparatus according to claim 2 wherein said base is fixedly secured the component of the vehicle wheel idle station tooling apparatus, said base including an opening formed therein for attaching said quick release pin thereto, and said quick release pin having an end which is moveable between a first position, wherein said end is disposed in an opening provided in said middle retainer so as to prevent removal of said middle retainer from said base, and a second position, wherein said end is not disposed in said opening provided in said middle retainer so as to enable said middle retainer to be removed from said base.

4. The vehicle wheel idle station tooling apparatus according to claim 2 wherein said center pilot further includes at least one spacer disposed between said middle retainer and said pilot and pin retainer.

5. The vehicle wheel idle station tooling apparatus according to claim 2 wherein said middle retainer, said spacer and said pilot and pin retainer are keyed together to maintain proper orientation therebetween.

6. The vehicle wheel idle station tooling apparatus according to claim 2 wherein said center pilot further includes at least one shim disposed between one of said middle retainer and said spacer and said spacer and said pilot and pin retainer.

7. The vehicle wheel idle station tooling apparatus according to claim 1 wherein said center pilot further includes a removable guide pin.

8. The vehicle wheel idle station tooling apparatus according to claim 1 wherein said rim block includes at least a pair of spaced apart annular shaped grooves formed therein to accommodate different sized wheel rims.

9. The vehicle wheel idle station tooling apparatus according to claim 1 wherein both said center pilot and said rim block are releasably secured to the stationary component by quick release pins.

10. The vehicle wheel idle station tooling apparatus according to claim 2 wherein said base, said middle retainer, said pilot and pin retainer and said pilot have a configuration which enables them to be stacked on top of each other in a nesting arrangement.

11. The vehicle wheel idle station tooling apparatus according to claim 1 wherein said quick release pin is a hand-retractable plunger.

12. The vehicle wheel idle station tooling apparatus according to claim 1 wherein a plurality of rim blocks are provided and arranged in a circumferential pattern so as to support the flange of the vehicle wheel around a substantial periphery thereof.

13. The vehicle wheel idle station tooling apparatus according to claim 12 wherein said rim blocks are adapted to support the flange of a bead seat attached vehicle wheel.

14. The vehicle wheel idle station tooling apparatus according to claim 12 wherein said rim blocks are adapted to support the flange of a drop center vehicle wheel.

15. The vehicle wheel idle station tooling apparatus according to claim 2 wherein said middle retainer is a multi-component middle retainer, said multi-component middle retainer including a first component and a second component, said first component supported on said base, and said second component adjustably supported relative to said first component and said base.

16. A vehicle wheel idle station tooling apparatus comprising:
    a center pilot adapted to be secured to a component of said vehicle wheel idle station tooling apparatus, said center pilot defining an outer diameter which is slightly less than an inner diameter defined by a pilot hole of a vehicle wheel so as to pilot the vehicle wheel on said center pilot; and
    a plurality of rim blocks adapted to be secured to a component of said vehicle wheel idle station tooling apparatus, each of said rim block including a surface which is operative to engage an outer surface of a flange of the vehicle wheel so as to support the vehicle wheel thereon;
    wherein at least one of said center pilot and said rim blocks is releasably secured to the stationary component by a quick release pin which enables said at least one of said center pilot and said rim blocks to be removed and replaced with a different sized component by a manual hand-operated manipulation of said quick release pin without resort to the utilization of a tool.

17. The vehicle wheel idle station tooling apparatus according to claim 16 wherein each of said rim blocks includes at least a pair of spaced apart annular shaped grooves formed therein to accommodate different sized wheel rims.

18. A vehicle wheel idle station tooling apparatus comprising:

a center pilot adapted to be secured to a component of said vehicle wheel idle station tooling apparatus, said center pilot defining an outer diameter which is slightly less than an inner diameter defined by a pilot hole of a vehicle wheel so as to pilot the vehicle wheel on said center pilot, said center pilot including a base, a middle retainer, a pilot and pin retainer and a pilot which are stacked on top of each other and connected together by a fastener; and a plurality of rim blocks adapted to be secured to a component of said vehicle wheel idle station tooling apparatus, each of said rim blocks including a surface which is operative to engage an outer surface of a flange of the vehicle wheel so as to support the vehicle wheel thereon;

wherein at least one of said center pilot and said rim blocks is releasably secured to the stationary component by a quick release pin which enables said at least one of said center pilot and said rim blocks to be removed and replaced with a different sized component by a manual hand-operated manipulation of said quick release pin without resort to the utilization of a tool.

19. The vehicle wheel idle station tooling apparatus according to claim 18 wherein said middle retainer is a multi-component middle retainer, said multi-component middle retainer including a first component and a second component, said first component supported on said base, and said second component adjustably supported relative to said first component and said base.

20. The vehicle wheel idle station tooling apparatus according to claim 18 wherein said center pilot further includes at least one spacer disposed between said middle retainer and said pilot and pin retainer.

* * * * *